US00RE47967E

(19) United States
(12) Reissued Patent
Maeng

(10) Patent Number: US RE47,967 E
(45) Date of Reissued Patent: Apr. 28, 2020

(54) METHODS, DEVICES, AND MEDIUMS FOR GENERATING A PROGRAMMING MENU

(71) Applicant: Intellectual Ventures Fund 79 LLC, Las Vegas, NV (US)

(72) Inventor: Joon Maeng, Newcastle, WA (US)

(73) Assignee: Intellectual Ventures Fund 79 LLC, Carson City, NV (US)

(21) Appl. No.: 15/400,621

(22) Filed: Jan. 6, 2017

Related U.S. Patent Documents

Reissue of:
(64) Patent No.: 8,930,999
Issued: Jan. 6, 2015
Appl. No.: 13/172,574
Filed: Jun. 29, 2011

(51) Int. Cl.

| | |
|---|---|
| ***H04N 5/445*** | (2011.01) |
| ***H04N 21/2365*** | (2011.01) |
| ***H04N 21/442*** | (2011.01) |
| ***H04N 21/431*** | (2011.01) |
| ***H04N 21/658*** | (2011.01) |
| ***H04N 21/458*** | (2011.01) |
| ***H04N 21/482*** | (2011.01) |
| ***H04N 21/434*** | (2011.01) |

(52) U.S. Cl.
CPC ..... *H04N 5/445* (2013.01); *H04N 21/2365* (2013.01); *H04N 21/4314* (2013.01); *H04N 21/4347* (2013.01); *H04N 21/44209* (2013.01); *H04N 21/4586* (2013.01); *H04N 21/4821* (2013.01); *H04N 21/6581* (2013.01)

(58) Field of Classification Search
CPC ..... H04N 5/445
See application file for complete search history.

(56) References Cited

U.S. PATENT DOCUMENTS

| | | | | |
|---|---|---|---|---|
| 5,663,757 | A * | 9/1997 | Morales | 725/5 |
| 6,133,909 | A * | 10/2000 | Schein et al. | 715/721 |
| 6,481,012 | B1 * | 11/2002 | Gordon et al. | 725/54 |
| 6,651,251 | B1 * | 11/2003 | Shoff et al. | 725/37 |
| 6,769,127 | B1 * | 7/2004 | Bonomi et al. | 725/39 |
| 6,973,621 | B2 * | 12/2005 | Sie et al. | 715/720 |
| 7,117,440 | B2 * | 10/2006 | Gordon et al. | 715/721 |
| 7,673,319 | B1 * | 3/2010 | Hendricks | H04N 5/44543 725/104 |
| 8,073,955 | B1 * | 12/2011 | Gagnon | H04N 21/84 709/203 |
| 8,381,246 | B2 * | 2/2013 | Skog et al. | 725/41 |
| 8,402,488 | B2 * | 3/2013 | Craner | H04N 5/44543 725/45 |
| 8,595,766 | B2 * | 11/2013 | Ahn | H04N 5/445 348/14.03 |
| 8,621,514 | B2 * | 12/2013 | Yao et al. | 725/41 |

* cited by examiner

*Primary Examiner* — Woo H. Choi
(74) *Attorney, Agent, or Firm* — Schwabe, Williamson & Wyatt

(57) ABSTRACT

Associating each of a plurality of identifiers with a respective one of a plurality of media streams and prompting a concurrent presentation of each of the plurality of identifiers and at least one image from each of the associated media streams in a display of a programming menu.

42 Claims, 7 Drawing Sheets

METHODS, DEVICES, AND MEDIUMS FOR GENERATING A PROGRAMMING MENU

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*This application is a broadening reissue of U.S. application Ser. No. 13/172,574, filed on Jun. 29, 2011, now U.S. Pat. No. 8,930,999, issued on Jan. 6, 2015.*

BACKGROUND

A known system for displaying media content automatically may generate a general programming menu to inform users of all current and upcoming programming available from content providers. One known programming menu may display an unsearchable scrolling table that includes text identifying programs and programming times. Another known programming menu may display a searchable table that includes text identifying programs and programming times. Such known programming menus may be inaccurate or inefficient, or both.

DETAILED DESCRIPTION

In an example, a device for generating a programming menu receives user selections indicating a set of programs to be included in a programming menu. Such a programming menu may be accessed and modified by a user. In one example, the programming menu provides live and/or recorded previews of one or more included programs in various viewing modes. A user may select a particular program to view in full screen from the programming menu.

Figure 1:
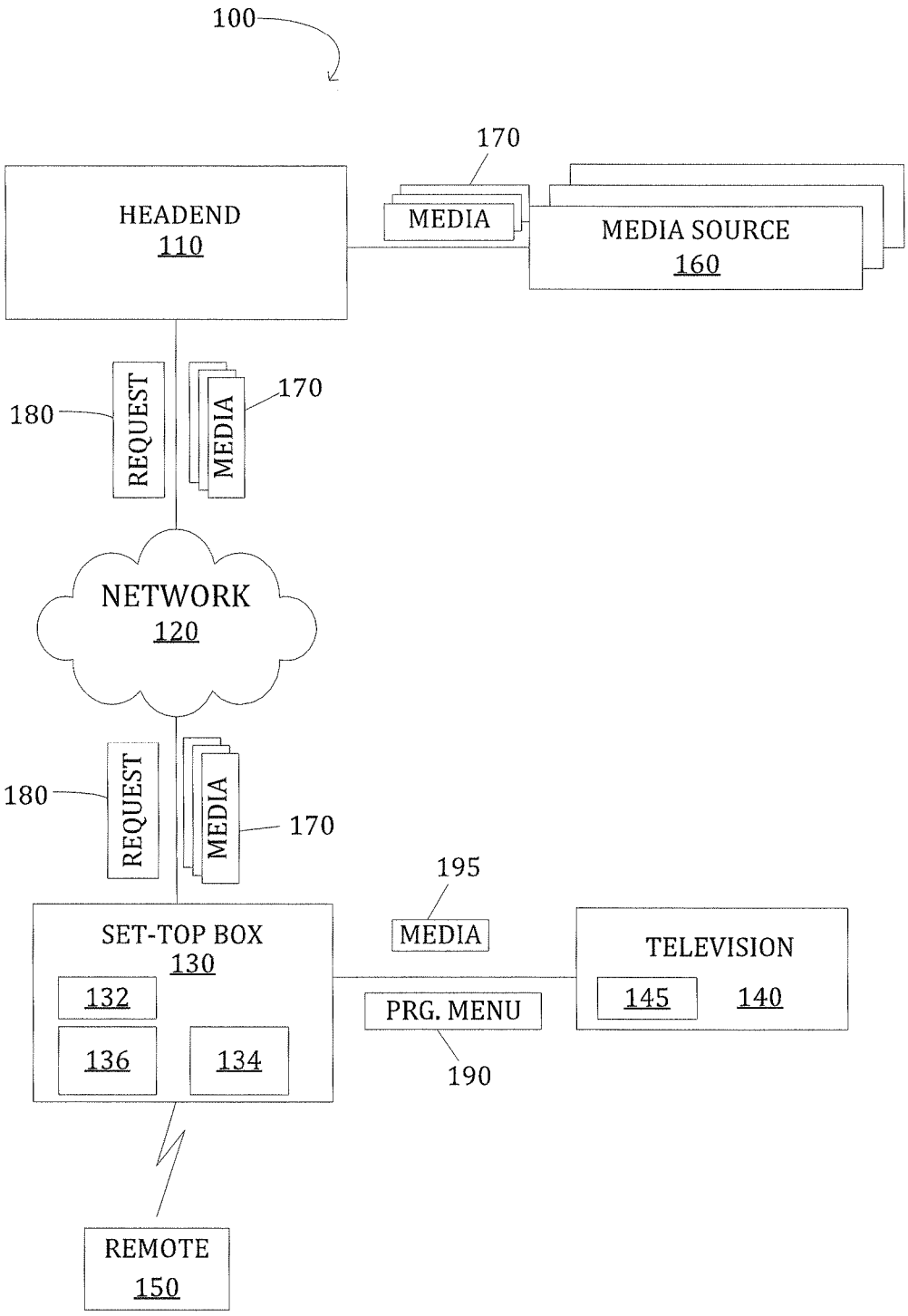
FIG. 1 depicts an example of a system for generating a programming menu.

FIG. 1 depicts an example of a system 100 for generating a programming menu. System 100 may provide media services from one or more content sources 160 to one or more media display devices, such as, for example, a television set 140. In one example, system 100 includes a head-end 110, a network 120, a set-top box 130, television set 140, and/or a remote communication device 150, or the like, or any combination thereof. For instance, in one example, set-top box 130 and television 140 may be a single device.

Head-end 110 may be a cable TV, a satellite, an Internet Protocol television (IPTV), a media distribution server, and/or another head-end for distributing media services. Head-end 110 may be configured to distribute one or more media streams 170 originating at one or more sources 160 to set-top box 130 via network 120. Network 120 may be wireless and/or wire-line media that provides one or more functional networks, such as, for example, a backbone, a local area network, a wide area network, a cable network, a satellite network, and/or the Internet, or the like, or any combination thereof.

In one example, set-top box 130 may receive an external signal, such as, for example, one or more media streams 170, and process media streams 170 for display on television 140 and/or other display devices, such as, a personal computer (PC), a laptop computer, a mobile phone, a personal digital assistant (PDA), a computer terminal, an electronic notebook and/or an electronic reader, or the like, or any combination thereof.

Set-top box 130 may send one or more media streams 170 to television set 140 for display. In some examples, set-top box 130 may serve as a digital video recording device. Set-top box 130 may record and store one or more media streams 170 in a library 134 in any of a variety of storage mediums known to those of skill in the art for later display. In one example, set-top box 130 may be configured to store a programming menu 190 in a database 136 in any of a variety of storage mediums known to those of skill in the art.

In one example, programming menu 190 may include a set of one or more channels, to be displayed for channel selection and/or programming set-top box 130. Particular channels may be included in the set of one or more channels based on a variety of criteria, including manual inclusion by a user and/or inclusion based on one or more channel selection algorithms executable by one or more processors, or any combinations thereof.

In one example, remote 150 may send control commands to set-top box 130 wirelessly to operate set-top box 130. Set-top box 130 may comprise a control panel 132 for receiving user inputs and may be operated by control buttons on control panel 132. Television 140 may comprise a control panel 145 for receiving user inputs and may be operated by control buttons on control panel 145. Television 140 may send control commands to set-top box 130 wirelessly and/or via a wire-line connection to operate set-top box 130.

In one example, a programming menu 190 may be accessed via remote control 150, set-box 130 and/or television 140. In addition or alternatively, other devices may access programming menu 190, such as, a PC, a laptop computer, a mobile phone, a PDA, a computer terminal, an electronic notebook and/or an electronic reader, or the like, or any combination thereof.

In one example, programming menu 190 may be accessed from database 136 at set-top box 130. Responsive to such access, set-top box 130 may send a request 180 to head-end 110 for one or more media streams 170. Request 180 may identify channels identified in programming menu 190. Media streams 170 may each correspond to a channel identified in the request.

In one example, set-top box 130 may receive and process media streams 170 from head-end 110 via network 120. Set-top box 130 may forward programming menu 190 to television 140 for display, and programming menu 190 may include at least one image from one or more of media streams 170. Alternately and/or additionally, programming menu 190 may be sent to other devices for display, including, for instance, a PC, a laptop computer, a mobile phone, a PDA, a computer terminal, an electronic notebook and/or an electronic reader, or the like, or any combination thereof.

In an another example, programming menu 190 may include at least one image from one or more of media streams 170 and at least one image from a media stream stored in library 134. In one example, a user may select a channel and/or stored digital media to view from programming menu 190 displayed on television 140 and/or other display device. A user selection may be communicated to set-top box 130 via remote 150, control panel 132, control panel 145, and/or any other suitable communication device. Responsive to channel and/or digital media selection, set-top box 130 may send a particular media stream 195 to television 140 for display.

Figure 2:
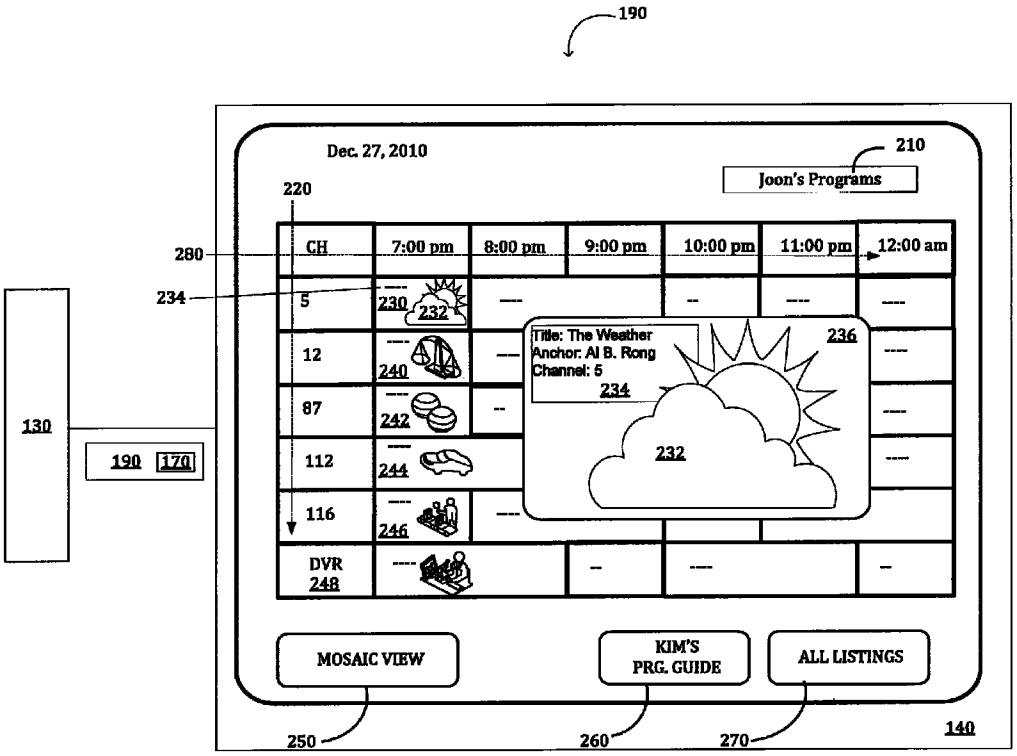
FIG. 2 depicts an example of a display for generating a programming menu.

FIG. 2 depicts an example of a programming menu 190. Programming menu 190 may be presented in a table view on television 140. In one example, programming menu 190 may display a programming menu name 210, such as "Joon's Programs." In one example, programming menu 190 may comprise several fields and/or cells arranged in a grid. Programming menu 190 may comprise a list of channels in column 220. Channels listed may include all available channels, channels selected by a user and/or channels selected by an algorithm for channel selection implemented in one or more processors, or the like, or any combination thereof.

In one example, program times may be listed in top row 280. Program data 234 and/or at least one image 232 from a media stream selected from one or more multiplexed media streams 170 may be displayed in field 230. In one example, field 230 may map to channel 5 and show time 7:00 pm and display image 232 corresponding to channel 5 and show time 7:00 pm.

Program data 234 may include a variety of information. In some examples, program data 234 may correspond to an associated channel, a user's personal information, a media stream associated with image 232, or the like, or any combination thereof. Program data 234 may comprise a program name, associated actors, a release date, a rating, a review, recommendations and/or the like, or any combination thereof. Program data 234 also may include commercial data and/or data related to advertising.

In one example, image 232 may comprise a display of a single image from an associated media stream or may comprise a display streaming a plurality of images from an associated media stream playing out. In one example, one or more fields 240, 242, 244, 246 and 248 in column 280 may be populated with program data and/or at least one image associated with a respective media stream selected from one or more media streams 170. Media streams 170 may be sent from a head-end 110 during designated program times. Additional media streams may be retrieved from memory in library 134 for inclusion in programming menu 190. Media streams included in programming menu 190 from library 134 may be indicated in the table, such as by showing selections available in a Digital Video Recording (DVR) row identified in field 248.

Programming menu 190 may comprise one or more selectable buttons including a view button 250 for changing the view to a different display type, a stored programming menu selector button 260 for selecting other stored programming menus, a general programming menu 190 for listing all available programs including at least programs available from head-end 110 and stored in library 134. Selection of view button 250 may change the way programming menu 190 is presented, such as, to a mosaic view (described further with respect to FIG. 3). Selection of a programming menu selector button 260 may display a different programming menu, such as, "Kim's Programming Menu."

In one example, users may customize programming menu 190 by selecting channels that may be displayed upon selection of general programming menu selector button 270. A user may save selected channels and assign selected channels to programming menu 190, another pre-existing programming menu, such as "Kim's Programming Menu" and/or save selected channels in a new programming menu, or the like, or any combination thereof. Users may edit programming menu 190 at any time.

In one example, a user may select a program for viewing by selecting a field, for instance, by selecting field 230 to view "The Weather" playing on channel 5. Programming menu 190 may display a selected program in a preview window 236. When a user selects field 230 and/or preview window 236, set-top box 130 may replace programming menu 190 with a full screen display of image 232 for viewing on a display device, such as television 140.

In programming menu 190, at least one image 232 may be refreshed at a pre-determined interval. A refresh rate of images in table view may be determined by network metrics, such as quality of service, bandwidth, congestion, speed and/or security protocols, and the like, or any combination thereof. In one example, at least one image in programming menu 190 may be updated in real-time and displayed as a moving image.

Figure 3:
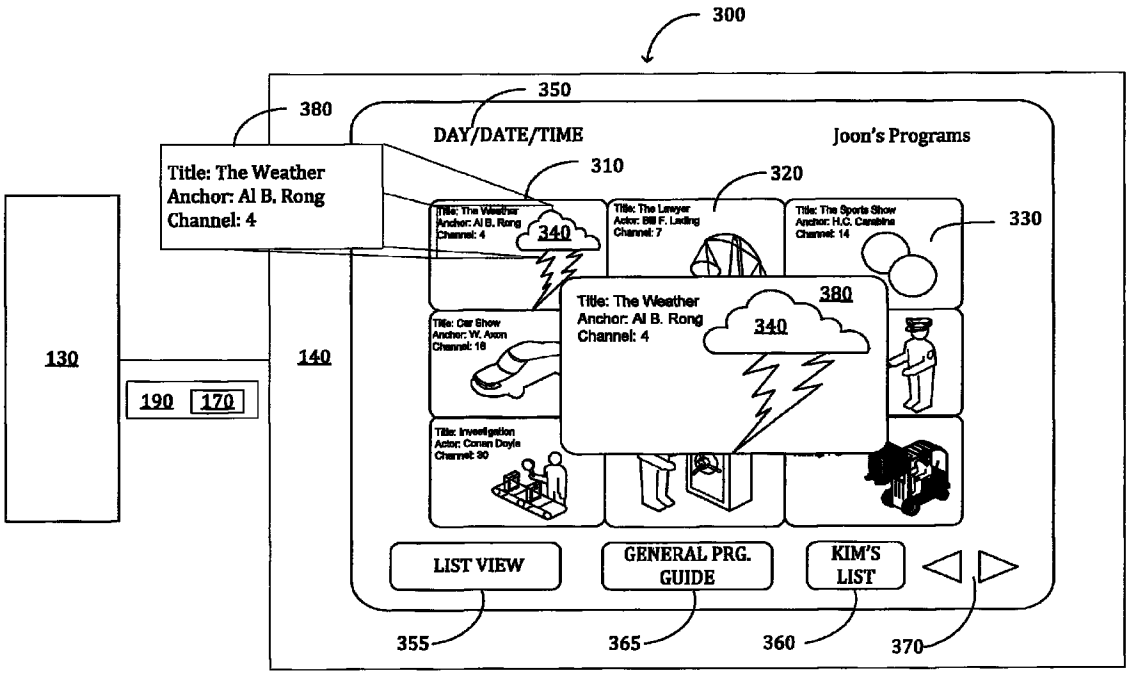
FIG. 3 depicts another example of a display for generating a programming menu.

FIG. 3 depicts an example of a display for generating a programming menu 190. Programming menu 190 may be sent from set-top box 130 to television 140 for display in a mosaic mode. In one example, mosaic mode may comprise a pre-determined number of thumbnail windows. In a representative example, programming menu 190 may include nine thumbnail windows. However, any number of thumbnail windows may be displayed. Thumbnail windows in programming menu 190 may correspond to a channel identified in programming menu 190 and/or media retrieved from library 134.

Channels identified in programming menu 190 may include all available channels, channels selected by a user and/or channels selected by an algorithm for channel selection implemented in one or more processors, and the like, or any combination thereof. In one example, thumbnail windows may display at least one image from a media stream selected from one or more multiplexed media streams 170 and/or retrieved media wherein each of the at least one images corresponds to a channel associated with a thumbnail window.

In one example, program days, dates and/or times may be identified in legend 350. Program data 380 and/or at least one image 340 of an associated media stream selected from media streams 170 may be displayed in thumbnail window 310. Program data 380 may include a variety of information. In some examples, program data 380 may correspond to image 340 describing a corresponding program name, a channel, associated actors, a release date, a rating, a review, and/or the like, or any combination thereof. Program data 380 may also include commercial data and/or data related to advertising. In one example, such commercial and advertising data may correspond to image 340.

In one example, image 340 may comprise a display of a single image from an associated media stream or may comprise a streaming display of a plurality of images from an associated media stream playing out. In one example, one or more thumbnail windows 310, 320 and 330 may be populated with program data and at least one image associated with a respective media stream selected from one or more media streams 170 and/or retrieved from library 134.

Programming menu 190 may comprise one or more selectable electronic buttons including a list view button 355 for changing the view to a different display type, a programming menu selector button 360 for selecting other stored programming menus (e.g., "Kim's List") and/or a general programming menu button 365 for listing all available programs. A selection of view button 355 may change the way programming menu 190 is presented, such as, to a table view. Selection of a programming menu selector button 360 may display a different programming menu, such as, "Kim's List." In one example, users may customize programming menu 190 by selecting channels and/or recorded programs that are to be displayed upon selection of general programming menu button 365. A user may save selected channels and assign selected channels to programming menu 190, a different pre-existing programming menu, such as "Kim's List" and/or save selected channels in a new programming menu, or the like, or any combination thereof. Users may edit programming menu 190 at any time. When a mosaic view cannot display all the programs in programming guide 190 at once, programming guide 190 may be displayed in multiple pages. Users may move to a next set of thumbnail images or a previous set of thumbnail images by selecting left or right arrow 370.

In one example, a user may select a program for viewing by selecting a particular thumbnail, for instance, by selecting thumbnail 310 to view "The Weather" currently playing on channel 4. Programming menu 190 may display a selected program in a preview window 380. When a user selects thumbnail 310 and/or preview window 380, set-top box 130 may replace programming menu 190 with a full screen display of image 340 for viewing on any appropriate display device, such as a television 140.

In programming menu 190, at least one image 340 may be refreshed at a pre-determined interval. A refresh rate of images in mosaic view may be determined by network metrics, such as quality of service, bandwidth, congestion, speed and/or security protocols, and the like, or any combination thereof. In one example, at least one thumbnail image (e.g., image 340) in programming menu 190 may be updated in real-time and displayed as a moving image.

Figure 4:
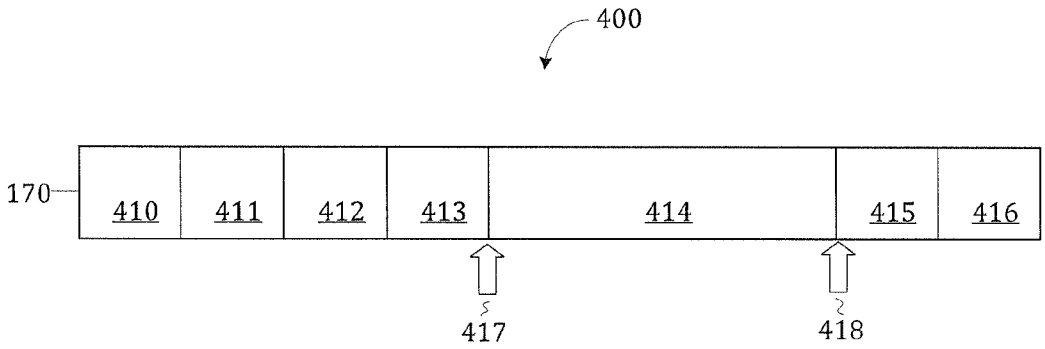
FIG. 4 depicts another example of a system for generating a programming menu.

FIG. 4 depicts an example of a system for generating a programming menu 190. In an illustrated example, head-end 110 may transmit multiplexed media stream 170 to set-top box 130 and/or other devices for processing and distributing media content. A multiplexed portion 400 of multiplexed media stream 170 may comprise a portion of each media stream associated with corresponding channels identified in programming menu 190. For instance, channels 10, 11, 12, 13, 14, 15 and 16 may be identified in programming menu 190. Images 410, 411, 412, 413, 414, 415 and 416 each may comprise a portion of media streams associated with respective ones of channels 10, 11, 12, 13, 14, 15 and 16.

When a user selects image 414 by sending a selection request at point 417, set-top box 130 may request head-end 110 to terminate transmission of multiplexed media stream 170 and further request that head-end 110 transmit a corresponding media stream continuously. In one example, a user may terminate continuous streaming and request a programming menu 190 at selection request point 418. Thereafter, head-end 110 may resume sending multiplexed media stream 170.

Figure 5:
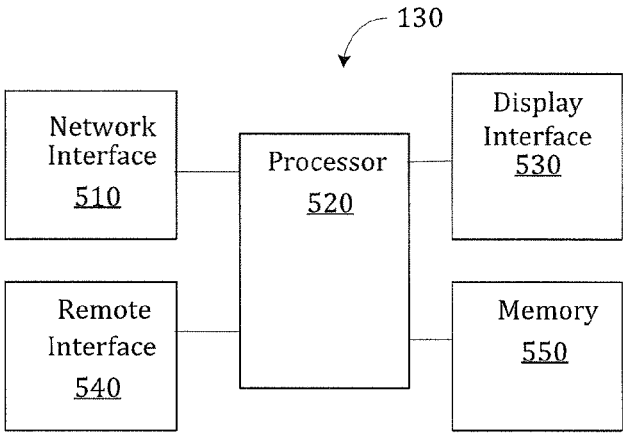
FIG. 5 depicts an example of a device for generating a programming menu.

FIG. 5 depicts an example of a device for generating a programming menu 190. As illustrated, set-top box 130 may comprise network interface 510, processor 520, display interface 530, remote interface 540, and memory 550. In one example, network interface 510 may interface with the network 120. Processor 520 may control network interface 510, processor 520, display interface 530, remote interface 540, and memory 550. Display interface 530 may interface with a display device such as television 140, a PC, a laptop computer, a mobile phone, a PDA, a computer terminal, an electronic notebook, an electronic reader, or the like, or any combination thereof. Remote interface 540 may communicate with remote device 150. Memory 550 may be volatile and/or non-volatile devices that store programs, commands, and program contents. Memory 550 may store data for database 136 and/or library 134, or the like, or any combination thereof.

Figure 6:
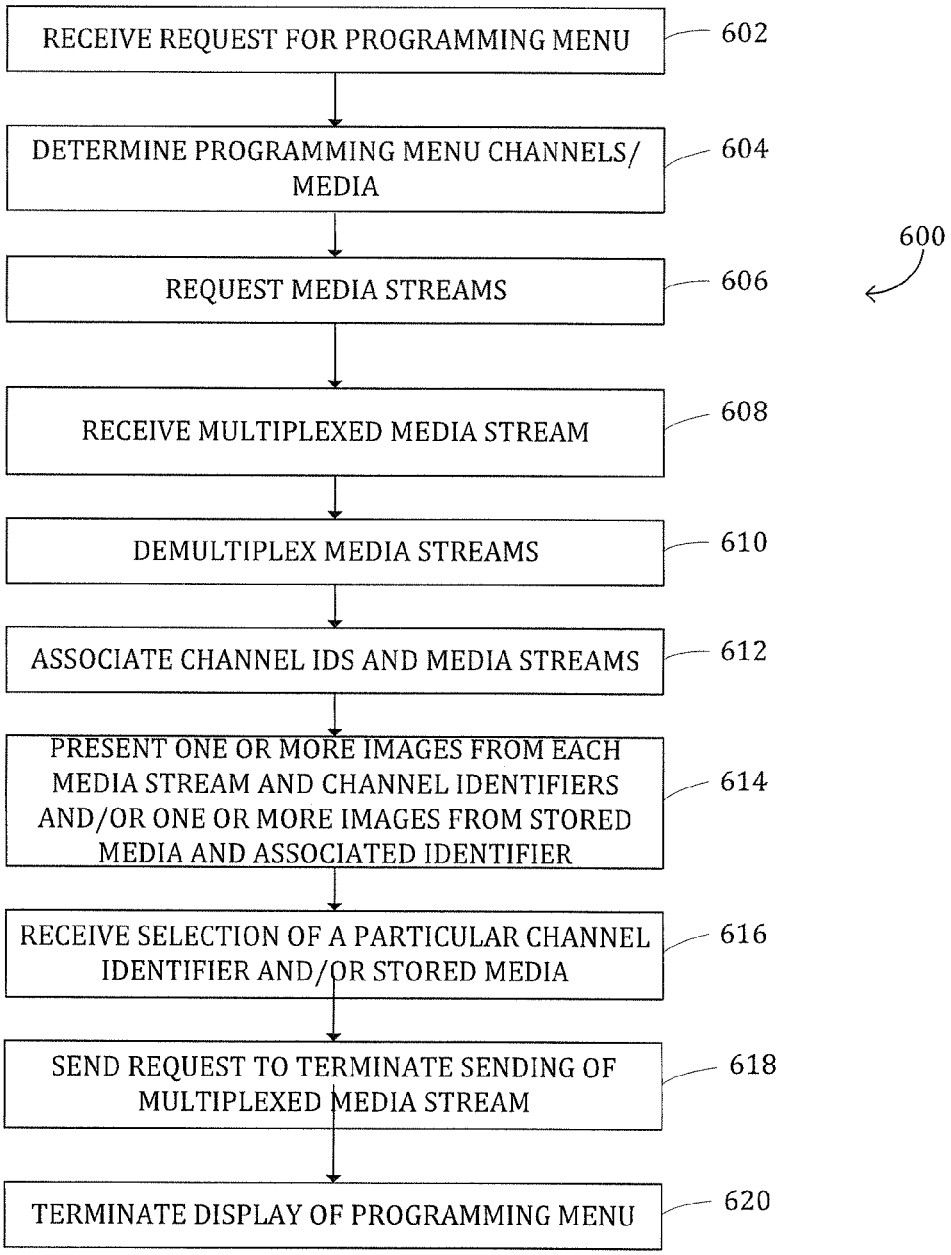
FIG. 6 depicts an example of a process for generating a programming menu.

FIG. 6 depicts an example of a process 600 for generating programming menu 190 (see also FIG. 1). In one example, process 600 begins at operation 602 where a processing device may receive a request for programming menu 190 including a programming menu identifier for identifying programming menu 190. Programming menu 190 may be associated with a programming menu identifier. Such a request may comprise a user input communicated from remote 150. In another example, a user may select and/or request programming menu 190 from a different device configured to communicate with set-top box 130 and/or head-end 110. Alternatively, a user may input a programming menu selection directly into set-top box 130 via control panel 132.

In operation 604, the processing device may access programming menu 190 to determine channels and/or stored media corresponding to programming menu 190. In one example, programming menu 190 may be stored in a database 136 associated with set-top box 130. Alternatively, in other examples, programming menu 190 may be retrieved from memory in a different device, such as, any of a variety of network devices, such as, for example, head-end 110, television 140, remote 150, a PC, a laptop computer, a mobile phone, a PDA, a computer terminal, an electronic notebook, an electronic reader, or the like, or any combination thereof.

In operation 606, the processing device may request one or more media streams from head-end 110 responsive to receiving a programming menu 190 selection. In one example, one or more requested media streams may correspond to channels identified in programming menu 190. In operation 608, in response to such a request for one or more media streams, the processing device may receive multiplexed media stream 170 comprising a plurality of media streams multiplexed together. Multiplexed media stream 170 may be sent from head-end 110.

In operation 610, the processing device may demultiplex multiplexed media stream 170. In operation 612, the processing device may associate each of a plurality of channel identifiers with one of a plurality of media streams selected from multiplexed media stream 170. Associations may be stored in memory in database 136. In some examples, such associations may be stored in a variety of data structures, such as, for instance, in a table, a tree and/or a linked list, or the like, or any combination thereof.

In operation 614, the processing device may prompt a display of programming menu 190 comprising a concurrent presentation of each of the plurality of channel identifiers and at least one image from each of the associated media streams and/or stored media corresponding to programming menu 190. In one example, the display of programming menu 190 may be in a table view. Such a table view may comprise a grid for mapping each channel identifier and/or stored media identifier to at least one image from one associated media stream and/or a programming time.

In another example, the display of programming menu 190 may be in a mosaic view comprising a predetermined number of windows inset within programming menu 190, wherein each inset window presents one channel identifier and at least one image from each associated media stream and/or at least one image from an indicated stored media stream and a corresponding stored media indentifier (e.g., a notation that a displayed media stream is available on DVR).

In operation 616, the processing device may receive a request selecting a particular channel identifier of the plurality of channel identifiers and/or stored media. The request may be a user input communicated from remote 150. In another example, the user may select and/or request the particular channel identifier. Such a request may be received from any device configured to communicate with the processing device, such as set-top box 130, head-end 110, a PC, a laptop computer, a mobile phone, a PDA, a computer terminal, an electronic notebook, an electronic reader, a network server, or the like, or any combination thereof.

In operation 618, responsive to the request selecting the particular channel identifier, the processing device may send a request to head-end 110 to terminate sending the multiplexed media stream. In operation 620, the processing device may terminate display of programming menu 190 and display a media stream associated with a selected channel and/or stored media.

Figure 7:
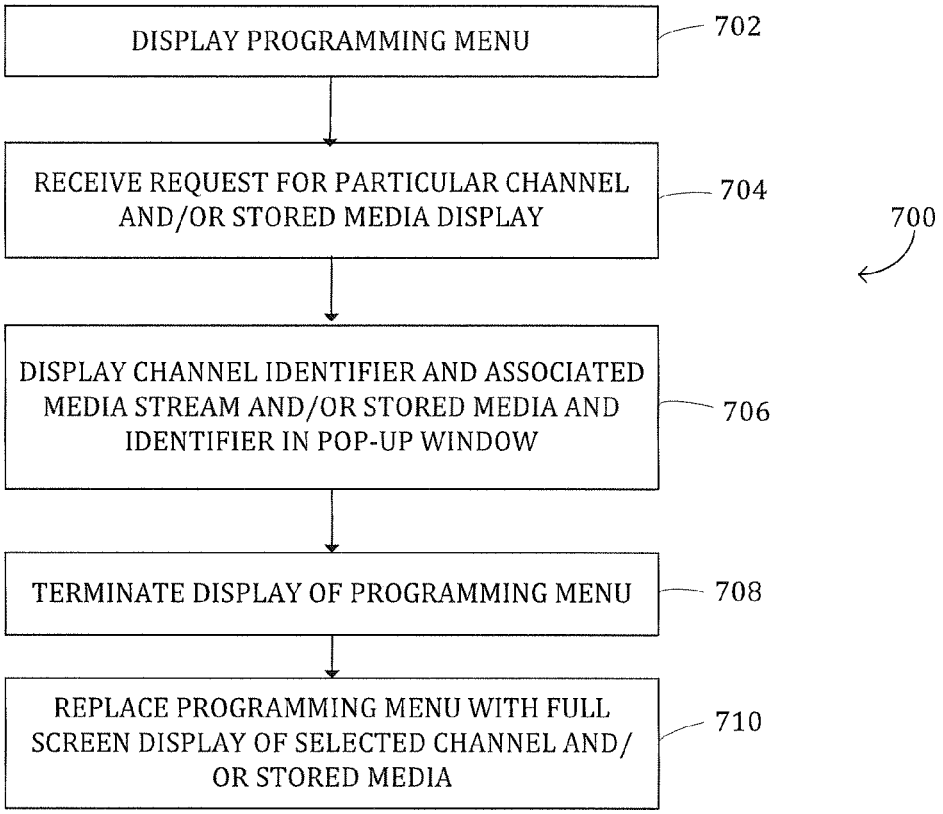
FIG. 7 depicts another example of a process for generating a programming menu.

FIG. 7 depicts an example of a process 700 for generating programming menu 190 (see also FIG. 1). In one example, process 700 begins at operation 702 where a processing device may prompt a display of a programming menu 190. Such a display may comprise a concurrent presentation of each of a plurality of channel identifiers and at least one image from one of a plurality of media streams received in multiplexed form.

In one example, a display may comprise a concurrent presentation of each of a plurality of channel identifiers and at least one image from one of a plurality of media streams received in multiplexed form and/or at least one image from stored media and an associated stored media identifier.

In operation 704, the processing device may receive a request for display of a particular channel and/or stored media. In one example, a user may select such a particular channel and/or stored media from the programming menu 190 for review. Such a request may be received from any of a variety of devices configured to communicate with the processing device, such as, for example, head-end 110, television 140, remote 150, set-top box 130, a PC, a laptop computer, a mobile phone, a PDA, a computer terminal, an electronic notebook, an electronic reader, or the like, or any combination thereof.

In operation 706, responsive to the requesting display of a particular channel and/or stored media, the processing device may display a media stream associated with a requested channel and/or stored media in a pop-up window overlayed on programming menu 190. In operation 708, responsive to a user input indicating a selection of the particular channel and/or stored media, the processing device may terminate display of programming menu 190. At operation 710, the processing device may replace the display of programming menu 190 with a full screen display of a media stream associated with the selected channel.

Figure 8:
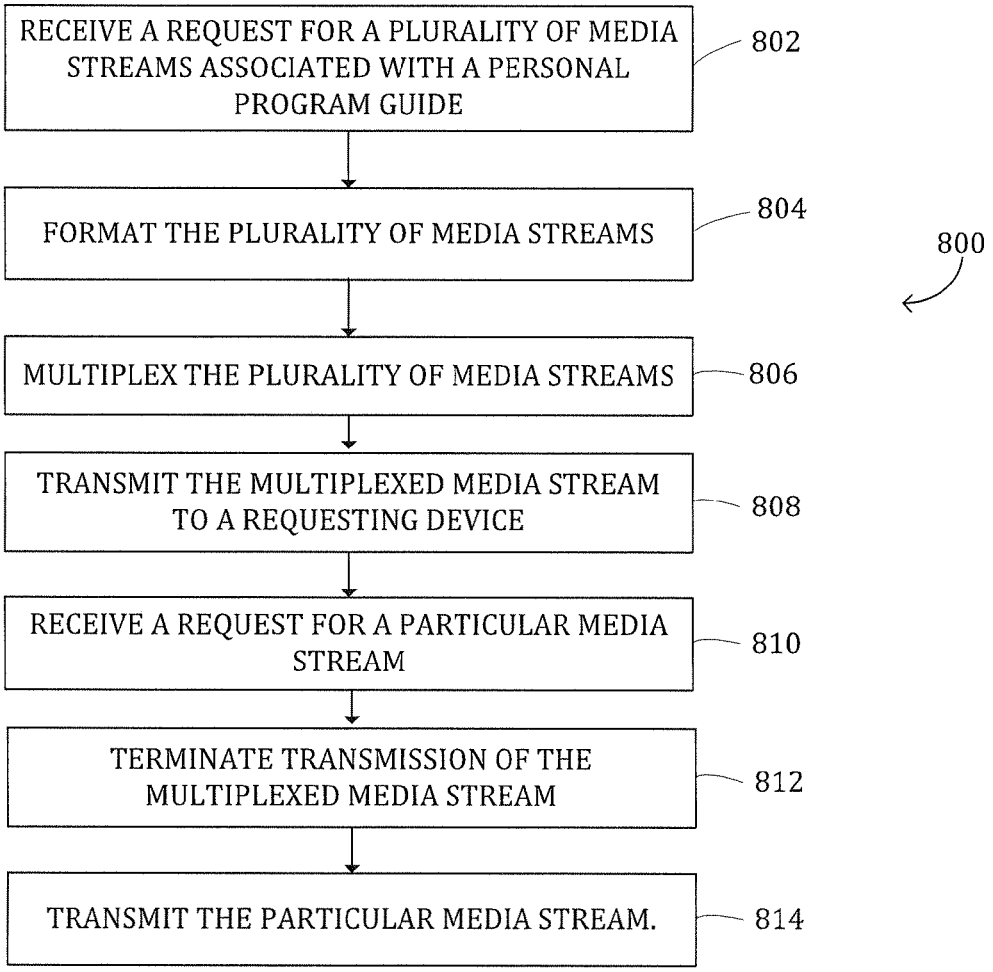
FIG. 8 depicts yet another example of a process for generating a programming menu.

FIG. 8 depicts an example of a process 800 for generating programming menu 190 (see also FIG. 1). In one example, process 800 begins at operation 802 where a head-end device 110 may receive a request for a plurality of media streams associated with a programming menu 190. In one example, the programming menu 190 may be for associating each of a plurality of channel identifiers with a respective one of the plurality of media streams.

In operation 804, the processing device may format the plurality of media streams for a concurrent presentation of each of the plurality of channel identifiers and at least one image from each the associated media streams. At operation 806, the processing device may multiplex the plurality of media streams forming a multiplexed media stream 170. In operation 806, the processing device may transmit the multiplexed media stream 170 to set-top box 130. In operation 810, the processing device may receive a request for a particular media stream of the plurality of media streams. In operation 812, responsive to the request for a particular media stream of the plurality of media streams, the processing device may terminate transmitting of the multiplexed media stream 170. In operation 814, the processing device may transmit the particular media stream.

The system and apparatus described above may use dedicated processor systems, micro controllers, programmable logic devices, microprocessors, or the like, or any combination thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a conventional rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or the like, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of examples, it should be apparent that the examples may be modified in arrangement and detail without departing from such principles. We claim all modifications and variation coming within the spirit and scope of the following claims.

The invention claimed is:

1. A method comprising:

receiving, by a processing device, a multiplexed media stream from a head-end device for use as a programming menu, wherein the multiplexed media stream comprises portions of broadcast media streams;

storing, by the processing device, a library of local media streams;

combining, by the processing device, the portions of the broadcast media streams from the multiplexed media stream with portions of the local media streams;

associating, by the processing device, each of a plurality of identifiers with a respective one of the broadcast media streams and the local media streams; [and]

prompting, by the processing device, a concurrent presentation of each of the plurality of identifiers and a concurrent display of images from each of the associated broadcast media streams and local media streams in a display of the programming menu*;*

*determining, by the processing device, a dynamic rate based on one or more network metrics; and*

*refreshing, by the processing device, the images at the dynamic rate.*

2. The method of claim 1, further comprising:

demultiplexing, by the processing device, the multiplexed media stream.

3. The method of claim 1, wherein the processing device is located in a set-top box and wherein the set-top box receives the multiplexed media stream from the head-end device, stores the library of local media streams, and combines the portions of the broadcast media streams from the multiplexed media stream with portions of the local media streams.

4. The method of claim 2, further comprising:

in response to an input for selecting a particular identifier of the plurality of identifiers, requesting, by the processing device, termination of the multiplexed media stream.

5. The method of claim 3, further comprising:

in response to an input for selecting the programming menu, requesting, by the processing device, one of the broadcast media streams from the head-end device or one of the local media streams from the library.

6. The method of claim 1, further comprising:

selecting, by the processing device, a user customized programming guide in response to a request; and displaying, by the processing device, the user customized programming guide based on the request.

7. The method of claim 6, wherein the [the] user customized programming guide is based on user selections from the plurality of identifiers displayed in the programming menu.

8. The method of claim 1, [further comprising refreshing, by the processing device, the images at a dynamic rate, wherein the dynamic rate is associated with] *wherein determining the dynamic rate based on the one or more network metrics further comprises determining the dynamic rate based on* network bandwidth or quality of service metrics, or a combination thereof.

9. The method of claim 1, further comprising:

selecting, by the processing device, one of the plurality of identifiers; and in response to the selecting one of the plurality of identifiers, prompting, by the processing device, a preview of the respective one of the broadcast media streams or local media streams in a pop-up window within the programming menu.

10. The method of claim 1, further comprising:

selecting, by the processing device, one of the plurality of identifiers;

in response to the selecting one of the plurality of identifiers, prompting, by the processing device, a full screen display of one of the broadcast media streams or local media streams associated with the selected one of the plurality of identifiers; and terminating, by the processing device, the display of the programming menu.

11. The method of claim 1, wherein the display of the programming menu is in a table view, wherein a table maps each of the plurality of identifiers to one of the images from each of the associated broadcast media streams and local media streams and a programming time.

12. The method of claim 1, wherein the display of the programming menu is in a mosaic view comprising a predetermined number of inset windows within the programming menu, wherein each of the predetermined number of inset windows presents one of the plurality of identifiers and the images from the associated broadcast media streams and local media streams.

13. A computer-readable memory device having instructions stored thereon that, in response to execution by a processing device, cause the processing device to perform operations comprising:

receiving a multiplexed media stream including multiplexed portions of a plurality of broadcast media streams;

demultiplexing the multiplexed media stream*;* storing local media streams;

combining the portions of the broadcast media streams with portions of the local media steams;

associating each of a plurality of channel identifiers with a respective one of the plurality of broadcast media streams or one of the local media streams; and prompting a concurrent presentation of each of the plurality of channel identifiers and a concurrent display of the portions from each of the associated broadcast media streams and local media streams in a display of a programming menu, *wherein the display of the programming menu further comprises video from each of the associated media streams, and wherein the operations further comprise:*

*refreshing the video at a dynamic rate, wherein the dynamic rate is associated with network bandwidth or quality of service metrics, or a combination thereof.*

14. The computer-readable memory device of claim 13, wherein the processing device is located in a set-top box.

15. The computer-readable memory device of claim 14, wherein the multiplexed media stream originates at a head-end device.

16. The computer-readable memory device of claim 15, wherein the operations further comprise:

in response to an input for selecting a particular channel identifier of the plurality of channel identifiers, sending a request to terminate transmission of the multiplexed media stream to the head-end device.

17. The computer-readable memory device of claim 15, wherein the operations further comprise:

in response to an input requesting the programming menu, sending a request for the multiplexed media stream to the head-end *device*.

18. The computer-readable memory device of claim 13, wherein the operations further comprise:

storing the programming menu in association with a programming menu identifier, wherein the prompting of the display of the programming menu is responsive to a request for the programming menu including the programming menu identifier.

19. The computer-readable memory device of claim 13, wherein the display of the programming menu further comprises concurrent presentation of each of the plurality of channel identifiers and *the* video from each of the associated media streams.

[20. The computer-readable memory device of claim 19, wherein the operations further comprise refreshing the video at a dynamic rate, wherein the dynamic rate is associated with network bandwidth or quality of service metrics, or a combination thereof.]

21. The computer-readable memory device of claim 13, wherein the operations comprising the prompting the concurrent presentation of each of the plurality of channel identifiers and the portions from each of the associated broadcast media streams and local media streams in the display of the programming menu, further comprises:

selecting one of the plurality of channel identifiers; and in response to the selecting one of the plurality of channel identifiers, prompting a preview of one of the associated broadcast media streams or local media streams in a pop-up window within the programming menu.

22. The computer-readable memory device of claim 13, wherein the operations further comprise:

selecting one of the plurality of channel identifiers;

in response to the selecting one of the plurality of channel identifiers, prompting a full screen display of one of the associated broadcast media streams or local media streams; and terminating the display of the programming menu.

23. The computer-readable memory device of claim 13, wherein the display of the programming menu is in a table view, wherein a table maps each of the plurality of channel identifiers to the portions from each of the associated broadcast and local media streams and a programming time.

24. The computer-readable memory device of claim 13, wherein the display of the programming menu is in a mosaic view comprising a predetermined number of windows inset within the programming menu, wherein each of the predetermined number of inset windows presents one of the plurality of channel identifiers and the portions from each of the associated broadcast and local media streams.

25. An apparatus[,] *to output to a display device, the apparatus comprising:*

*a processing device; and*

*a computer-readable memory device having computer-executable instructions stored thereon that, in response to execution by the processing device, cause the processing device to perform operations* comprising:

[a memory device configured to store instructions associated with an application program; and a processing device that, in response to executing the instructions stored in the memory device, is configured to:]

[receive] *receiving*, from a head-end device, a multiplexed media stream comprising portions of video from a plurality of broadcast media streams;

[demultiplex] *demultiplexing* the multiplexed media stream*;*

[store] *storing* local media streams;

[combine] *combining* the portions of video from the broadcast media streams with portions of the local media steams;

[associate] *associating* each of a plurality of channel identifiers with a respective one of a plurality of broadcast media streams or one of the local media streams; [and]

[prompt a] *prompting the* display device to display a programming menu comprising a concurrent presentation of each of the plurality of channel identifiers and a concurrent display of the video from the associated broadcast media streams and local media streams*; and*

*refreshing the broadcast media streams video at a dynamic rate, wherein the dynamic rate is based on network bandwidth or quality of service metrics, or a combination thereof.*

26. The apparatus of claim 25, wherein the processing device is located in a set-top box.

27. The apparatus of claim 26, wherein the [processing device is further configured to] *operations further comprise*:

[receive] *receiving*, from a remote communication device, an input for selecting a particular channel identifier of the plurality of channel identifiers; and

[send] *sending* a message from the set-top box requesting termination of the multiplexed media stream to the head-end device based on the input.

28. The apparatus of claim 25, wherein the [processing device is further configured to] *operations further comprise*:

[receive] *receiving*, from a remote communication device, an input for selecting the programming menu; and in response to the input, send a message requesting the multiplexed media stream from the head-end device.

29. The apparatus of claim 25, wherein the [processing device is further configured to] *operations further comprise*:

[associate] *associating* the programming menu with a programming menu identifier; and

[receive] *receiving* a request for the programming menu from a remote communication device, the request including the program menu identifier;

wherein the prompting the display device to display the programming menu is responsive to receiving the request.

[30. The apparatus of claim 25, wherein the processing device is further configured to refresh the from the broadcast media streams video at a dynamic rate, wherein the dynamic rate is based on network bandwidth or quality of service metrics, or a combination thereof.]

31. The apparatus of claim 25, wherein the [processing device is further configured to] *operations further comprise*:

[select] *selecting* one of the plurality of channel identifiers; and

[prompt] *prompting* a preview of one of the associated broadcast media streams or local media streams in a pop-up window within the programming menu.

32. The apparatus of claim 25, wherein the [processing device is further configured to] *operations further comprise*:

[select] *selecting* one of the plurality of channel identifiers; in response to the selecting one of the plurality of channel identifiers, prompt a full screen display of one of the associated broadcast media streams or local media streams; and terminate the display of the programming menu.

33. The apparatus of claim 25, wherein the [processing device is further configured to] *operations further comprise:*

[prompt] *prompting* the display device to display the programming menu in a table view.

34. The apparatus of claim 25, wherein the [processing device is further configured to] *operations further comprise:*

[prompt] *prompting* the display device to display the programming menu in a mosaic view comprising a predetermined number of windows inset within the programming menu.

35. [An apparatus,] *A system, comprising:*

*processing devices; and*

*computer-readable memory devices having computer-executable instructions stored thereon that, in response to execution by the processing devices, cause the processing devices to perform operations* comprising:

[means for] multiplexing portions of media streams into a multiplexed media stream, wherein the media streams include both broadcast media streams and local media streams *and the multiplexed portions of the media streams comprise portions of only the broadcast media streams*;

[means for] associating each of a plurality of channel identifiers with a respective one of the portions of media streams; [and]

[means for] transmitting the multiplexed media stream to a receiving device and prompting a concurrent presentation of each of the plurality of channel identifiers and a concurrent display of the portions of the associated media streams in the multiplexed media stream in a display of a programming menu *with the local media streams, wherein the prompting a concurrent presentation includes displaying multiple images from each of the associated media streams; and*

*refreshing the multiple images at a dynamic rate, wherein the dynamic rate is associated with network bandwidth or quality of service metrics, or a combination thereof.*

36. The [apparatus] *system* of claim 35, wherein the receiving device comprises a television.

37. The [apparatus] *system* of claim 36, wherein the broadcast media streams originate at a head-end device.

38. The [apparatus] *system* of claim 35, [further comprising] *wherein the operations further comprise*:

[means for] selecting a particular channel identifier of the plurality of channel identifiers; and

[means for] receiving a request to terminate the multiplexed media stream in response to the selecting a particular channel identifier.

39. The [apparatus] *system* of claim 35, [further comprising] *wherein the operations further comprise*:

[means for] selecting the programming menu in response to a request for the programming menu.

40. The [apparatus] *system* of claim 35, [further comprising] *wherein the operations further comprise*:

[means for] associating the programming menu with a programming menu identifier; and

[means for] selecting the programming menu in response to a request for the programming menu comprising the programming menu identifier.

[41. The apparatus of claim 35, wherein the means for prompting a concurrent presentation includes means for displaying multiple images from each of the associated media streams.]

[42. The apparatus of claim 41, further comprising means for refreshing the multiple images at a dynamic rate, wherein the dynamic rate is associated with network bandwidth or quality of service metrics, or a combination thereof.]

43. The [apparatus] *system* of claim 35, [further comprising] *wherein the operations further comprise*:

[means for] selecting one of the plurality of channel identifiers; and

[means for] prompting a preview of one of the associated media streams in a pop-up window within the programming menu in response to the selecting, by the [means for] selecting, one of the plurality of channel identifiers.

44. The [apparatus] *system* of claim 35, [further comprising] *wherein the operations further comprise*:

[means for] selecting one of the plurality of channel identifiers;

[means for] prompting a full screen display of one of the associated media streams in response to the selecting, by the [means for] selecting, one of the plurality of channel identifiers; and

[means for] terminating the display of the programming menu.

45. The [apparatus] *system* of claim 35, wherein the display of the programming menu is in a table view, wherein a table maps each of the plurality of channel identifiers to the portions from each of the associated media streams and a programming time.

46. The [apparatus] *system* of claim 35, wherein the display of the programming menu is in a mosaic view comprising a predetermined number of windows inset within the programming menu, wherein each of the predetermined number of inset windows presents one of the plurality of channel identifiers and the at least one image from each of the associated media streams.

[47. A method comprising:

receiving, by a processing device, a request for transmitting a programming guide identifying a plurality of channel identifiers associated with the programming guide;

identifying a plurality of media streams associated with the plurality of channel identifiers, wherein the plurality of media streams include both broadcast media streams and locally stored media streams;

formatting, by the processing device, the plurality of media streams for a concurrent presentation of each of the plurality of channel identifiers and at least one image from each the associated plurality of media streams;

multiplexing, by the processing device, portions of video from each of the plurality of media streams into a multiplexed media stream; and transmitting, by the processing device, the multiplexed media stream to a set-top box for using as part of the programming guide.]

[48. The method of claim 47, further comprising;

terminating, by the processing device, the transmitting of the multiplexed media stream in response to a request for a particular one of the plurality of media streams; and transmitting, by the processing device, the particular one of the plurality of media streams associated with the request.]

* * * * *